United States Patent Office 2,783,378
Patented Feb. 26, 1957

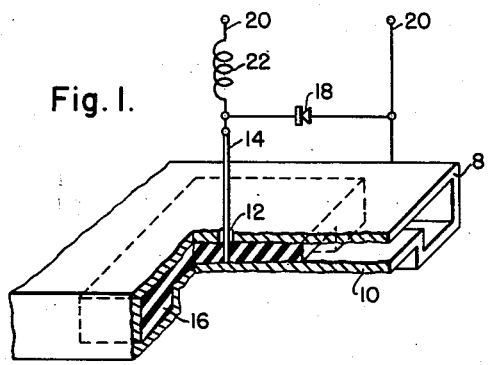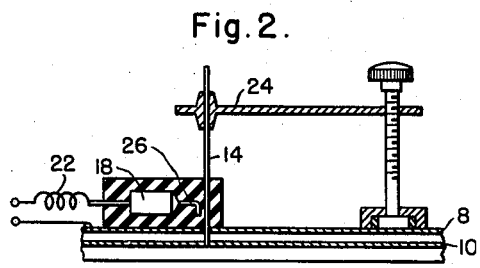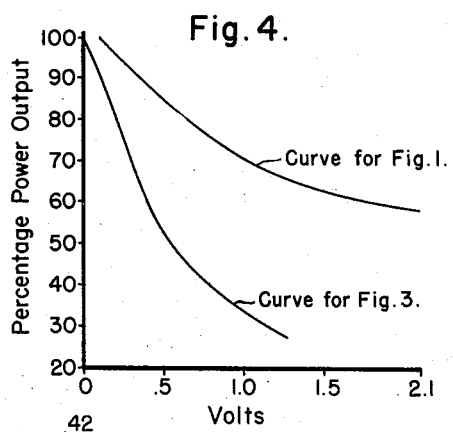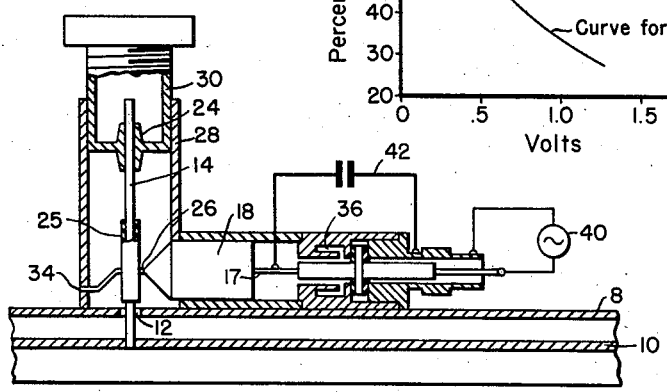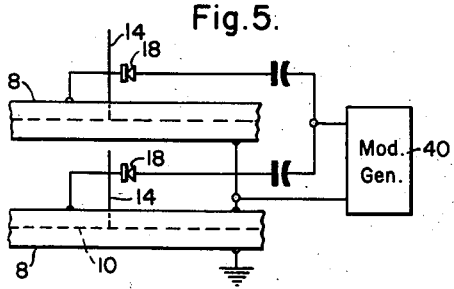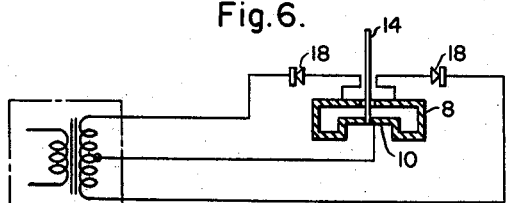
INVENTORS
Clyde E. Vogeley, Jr. &
William L. Stahl.

2,783,378

MODULATION IN A RIDGED WAVE GUIDE

Clyde E. Vogeley, Jr., Pittsburgh, Pa., and William L. Stahl, Chicago, Ill., assignors, by mesne assignments, to the United States of America as represented by the Secretary of the Navy Application July 30, 1949, Serial No. 107,758

6 Claims. (Cl. 250—31)

Our invention relates to the modulation of microwaves and more particularly to the amplitude modulation of microwaves while they are passing down a ridged wave guide.

In the prior art of which we are aware, the amplitude modulation of microwaves in standard rectangular wave guides has been accomplished by mechanical methods such as by mechanically varying the depth into which a probe or a rotating attenuator extends into a wave guide. The modulation of microwaves has also been achieved by impressing a varying magnetic field on a piece of polystyrene containing powdered iron which has been placed in the guide or by placing a crystal in the guide and varying its impedance by means of a modulating voltage across the terminals of the crystals. These methods have proven themselves to be impractical when used in conjunction with a ridged wave guide, the small dimensions of which and the resulting field configurations in which make the insertion of such devices in a ridged wave guide impractical, if not impossible. The high field strengths encountered in the ridged wave guide make the mechanical methods unsatisfactory because of the high degree of accuracy which is required in controlling the movements of any such mechanical assembly as well as the space limitations.

It is, accordingly, an object of our invention to provide a method of amplitude modulating microwaves in a ridged wave guide.

Another object of our invention is to provide apparatus for the amplitude modulating of microwaves in a ridged wave guide which may be controlled accurately.

A further object of our invention is to provide apparatus for the amplitude modulating of microwaves in a ridged wave guide in which the phase of the modulations may be controlled independently of the source of modulating voltage.

In accordance with our invention a probe is inserted into a ridged wave guide. Connected to the probe at a point external to the wave guide is a unidirectional device, the impedance of which will vary in response to changes in the current passing through it. In a preferred embodiment of our invention, this unidirectional device is a germanium crystal with welded contacts and will be referred to as a crystal hereinafter. From the opposite side of the crystal from that which is connected to the probe, a conductor is attached which leads to the wave guide or to ground. Connections are supplied for placing a modulating potential across the crystal. The connections between the probe and the crystal need not be of a continuous conductor but instead the two may be capacitively coupled together. As was pointed out above, the impedance which the crystal will offer to a current passing through it will vary with the strength of the current through the crystal. Thus, when the potential of the modulating signal varies it changes the impedance of the crystal and thus changes the quantity of power which is absorbed from inside the wave guide by the probe.

The novel features which we consider characteristic of our invention are set forth with more particularity in the appended claims. The invention, however, with respect to both the organization and the operation thereof, together with other objects and advantages may be best understood from the following description of specific embodiments with reference to the accompanying drawing, in which:

Figure 1 is a perspective view partly in section of an apparatus embodying our invention;

Fig. 2 is a schematic showing of apparatus embodying our invention in which the coupling between the crystal and the probe is capacitive;

Fig. 3 is a cross sectional view of apparatus similar to that shown schematically in Fig. 2;

Fig. 4 is a graph in which the potential across the crystal is ploted against the power percentage power output from the wave guide. Two curves are plotted; one for apparatus substantially as shown in Fig. 1, and one for apparatus substantially as shown in Fig. 3;

Fig. 5 is a schematic showing of a circuit arrangement for utilizing the phase control aspect of our invention;

Fig. 6 is a schematic showing of a device for amplitude modulation embodying our invention in which two crystals arranged in push-pull are employed.

Figure 7:
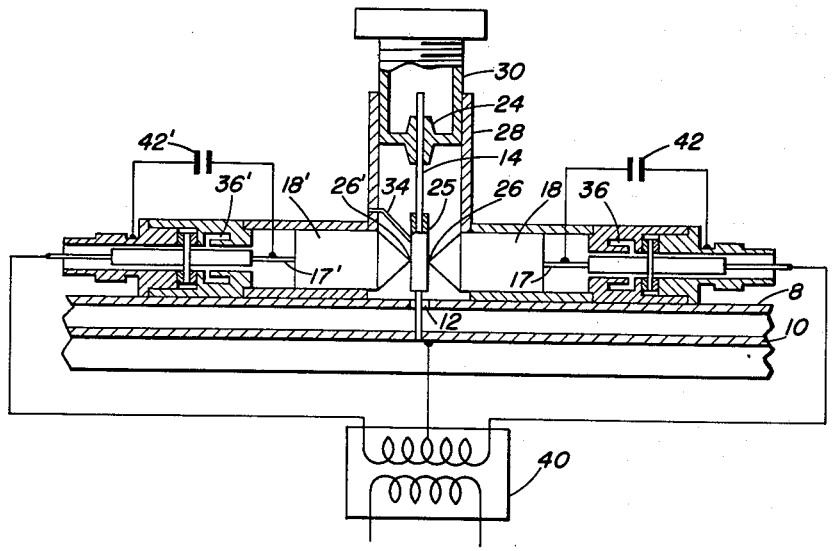
Fig. 7 is a cross sectional view of an apparatus similar to the apparatus shown in Fig. 3 and illustrating the embodiment of the invention shown schematically in Fig. 6.

The ridged wave guide 8, employed in a preferred embodiment of our invention, is a hollow metal box of substantially rectangular cross section with a longitudinal re-entrant portion 10 extending into one of the sides of longer area.

In a preferred embodiment of our invention, a ridged wave guide is provided with a hole 12 through the side opposite the re-entrant portion 10 near the center of that side. This hole is of sufficient size to allow a probe 14 to be inserted therethrough without touching the metallic side of the wave guide. A probe 14 is inserted through the hole 12 and fastened to the re-entrant portion 10 of the wave guide at a point opposite the hole 12. The probe is of such length that on being attached to the re-entrant portion it extends through the hole 12 in the wave guide and into the region external thereto. In a preferred embodiment of our invention, the probe 14 is insulated from the wave guide by a polystyrene block 16 which gives the probe 14 mechanical support so as to reduce any spurious modulation due to its mechanical vibration. We have found that a probe diameter of .030 inch is desirable. Connected to the probe at a point external to the wave guide as shown in Fig. 1 is a crystal 18 which is connected on its other side to the wave guide. Connections 20 are supplied for placing a modulating potential across the crystal. In a preferred embodiment of our invention a radio frequency choke 22 is inserted between one of said connections and the crystal to prevent the oscillations in the wave guide from affecting the modulating source.

In the device built by us, a crystal of germanium with welded contacts was employed and was found to produce highly satisfactory results. The crystal actually used by applicants was manufactured by General Electric and designated by the type number 1N51.

In another embodiment of our invention, an electronic tube which is unidirectional and the impedance of which changes with the current through the tube is employed. However, this was not found to be as satisfactory as the germanium crystal with welded contacts.

In the operation of our device, the modulation potential is applied across the crystal 18. As the modulation potential increases, we have found that the attenuation increases, i. e. the power passing down the wave guide decreases. Thus a change in the modulation potential produces a change in the power allowed to escape from the interior of the wave guide.

We have found that with a device as shown in Fig. 1 and described above employing a welded contact germanium crystal, 14% modulation was achieved when two volts A.-C. R. M. S. were impressed across the crystal. When a .017" diameter probe was employed with three volts A.-C. R. M. S. across the germanium crystal, 34% modulation was achieved. Applicants were thus able to amplitude modulate a signal passing down a portion of ridged wave guide without employing moving mechanical parts, without suffering from high insertion losses and with minimum danger from vibration and mechanical shock. A carrier wave of approximately 10,000 megacycles was employed.

In another embodiment of our invention a tuning device is provided which consists of a sliding contact 24 connected electrically to the wave guide and in contact with the probe. By adjusting the point of contact with the probe, applicants are able to tune the device.

Applicants have found that better results are obtained if the crystal is not physically connected to the probe but rather a capacity coupling is employed between the crystal terminal 26 and the probe. This is shown in Fig. 2 schematically. The spacing between the crystal terminal and the probe is critical. In one embodiment of our invention, we have therefore employed a probe of lacquered wire and allowed the crystal terminal to come in contact with the lacquered insulating surface of the probe. Thus the spacing between the probe and the crystal terminal is controlled and equal to the thickness of the lacquered insulating surface. The crystal terminal 26 is preferably of a length of approximately a quarter of an inch. The terminal of the crystal adjacent to the probe is grounded after passing the probe. The modulating potential is applied between the other terminal 17 of the crystal 18 and ground. A choke coil 22 connected between the crystal and the source of modulating potential may be used to prevent the high frequency oscillations from reaching the modulation source. The modulation source may also be protected as shown in Fig. 3 by the use of a by-pass connected to ground through a capacitance.

In Fig. 4, curves of potential across the crystal against the percentage power output in the wave guide are plotted for a device as shown in Fig. 1 and for a device as shown in Fig. 3. From this graph the advantage of having the crystal terminal capacitively coupled to the probe rather than directly connected to the probe will be evident.

In one embodiment of our invention as shown in Fig. 3, a ridged wave guide 8 is provided with a probe 14 attached to the re-entrant portion 10 thereof and extending through the opposite side of the wave guide without touching that side. A variable contact 24 is connected to the probe exterior to the wave guide. A circular supporting member 28 is attached to the wave guide and surrounds the probe. This circular supporting member 28 is threaded inside and has fitted therein a plug 30 which is threaded to engage the threads of the circular supporting member. The plug 30 is attached to the sliding contact 24 so that when the plug is rotated the contact is moved up and down the probe. A unidirectional device, the impedance of which will vary in response to the current passing through it, is provided as described above and attached thereto is a terminal 26 which extends through the region near the probe and at a point 34 beyond the probe is grounded. The probe is coated with a lacquer to prevent the terminal from contacting the metal of the probe and the terminal is built to touch the lacquer surface 25. The crystal is attached through a radio frequency choke 36 to a source of modulating potential 40 and a capacity by-pass 42 is connected between the side of the crystal opposite to the side on which the terminal is attached, and ground. The radio frequency oscillations are thus discouraged from entering the source of modulating potential.

To reduce distortion, two crystals may be employed in push-pull as shown schematically in Fig. 6. The two crystals are so mounted and the modulation voltage is so applied that the phase of the modulation caused by each crystal is adjusted so that it is in the opposite phase at any given moment from that produced by the other crystal. By such operation, distortion is greatly reduced since each crystal operates on the linear portion of its current vs. impedance curve during the half cycle of the modulating voltage during which it is conducting. The phase of the crystals may be adjusted so that they will modulated out of phase with each other by varying the distance of the point of coupling between the crystal and the probe from the wave guide. It will be noted that the coupling between crystals 18 and probe 14 is capacitative as schematically shown in the drawing.

The fact that the location of the point of contact between the crystal terminal and the probe controls the phase of modulation may also be employed in tagging signals. Thus the modulation potential can originate at a common source for two different crystals and yet by adjusting the point of contact between a crystal terminal and a probe the phase of the signals can be varied so that each signal may be distinguished from the other. An arrangement in accordance with this aspect of our invention is shown schematically in Fig. 5.

In Fig. 7 there is shown a cross sectional view of an apparatus similar to that shown in Fig. 3, described above, which illustrates the embodiment of the invention shown schematically in Fig. 6. In Fig. 7 the structure comprising crystal 18, choke 36, and capacitor 42 has been duplicated in order to provide a double crystal structure suitable for use in the bi-phase arrangement shown in Fig. 6. The portions of Fig. 7 which correspond to portions of Fig. 3 have been indicated by the same reference numerals and the duplicated parts have been shown by primed reference numerals. In Fig. 7 a pair of crystals 18, 18' each has one terminal capacitively coupled to probe 14 and connected to ground at 34. The other terminals 17, 17' of crystals 18, 18' are coupled through chokes 36, 36' to a modulating source 40. By-pass capacitors 42, 42' are connected to crystal terminals 17, 17', respectively, and to ground to oppose the entry of radio frequency oscillations into the source of modulating potential. As in Fig. 3, in order to tune the device, probe 14 is provided with a sliding contact 24 attached to a threaded plug 30 received in a circular supporting member 28.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination, a ridged wave guide, a probe fastened to one side of said ridged wave guide and extending through the opposite side thereof, a germanium crystal external to said ridged wave guide, a capacitive coupling between said probe and said crystal, connections for impressing an alternating potential across said crystal, connections between one end of said crystal and said ridged wave guide.

2. In combination, a ridged wave guide, a probe fastened to one side of said ridged wave guide and extending through the opposite side thereof, a germanium crystal external to said ridged wave guide, a capacitive coupling between said probe and said crystal, connections for impressing an alternating potential across said crystal between one end of said crystal and said ridged wave guide, and a radio frequency choke connected between one of said connections and said crystal in such manner as to discourage radio frequency waves from escaping through said connections.

3. In combination, a ridged wave guide, a probe fastened to one side of said ridged wave guide and extending through the opposite side thereof, a germanium crystal external to said ridged wave guide, a capacitive coupling between said probe and said crystal, connections for impressing an alternating potential across said crystal, connections between one end of said crystal and said ridged wave guide, a sliding contact connected to said probe, and connections between said sliding contact and ground.

4. In combination, a ridged wave guide, a probe fastened to one side of said ridged wave guide and extending through the opposite side, a germanium crystal external to said ridged wave guide, a capacitive coupling between said probe and said crystal, connections for impressing an alternating potential across said crystal, a radio frequency choke connected between said crystal and one of said connections in such manner as to discourage radio frequency waves from escaping through said connections, a sliding contact connected to said probe, and connections between said sliding contact and ground.

5. The combination of claim 1 wherein there is further provided a second germanium crystal external to said ridged wave guide, a capacitive coupling between said probe and said second crystal, connections between one end of said second crystal and said ridged wave guide, and connections for impressing said alternating potential across said second crystal to operate said crystals in push-pull.

6. The combination of claim 5 wherein there is further provided a sliding contact connected to said probe, and connections between said sliding contact and ground.

References Cited in the file of this patent

UNITED STATES PATENTS

| | | |
|---|---|---|
| 2,411,553 | Ramo | Nov. 26, 1946 |
| 2,441,598 | Robertson | May 18, 1948 |
| 2,442,606 | Korman | June 1, 1948 |
| 2,444,060 | Ohl | June 29, 1948 |
| 2,457,601 | Ring | Dec. 28, 1948 |
| 2,458,579 | Feldman | Jan. 11, 1949 |
| 2,484,256 | Vaughan | Oct. 11, 1949 |

OTHER REFERENCES

"Crystal Rectifiers," vol. 15, M. I. T. Radiation Laboratory Series, published in 1948 by McGraw-Hill Book Company, pages 354–5 relied on.

Publication: "Very High Frequency Techniques," volume II, by Radio Research Laboratory of Harvard University, published in 1947 by the McGraw-Hill Book Company, pages 607, 726 and 727 relied on.